(12) United States Patent
Huang

(10) Patent No.: US 8,463,878 B2
(45) Date of Patent: Jun. 11, 2013

(54) NETWORK SERVER FOR PROVIDING SCANNING FUNCTIONALITY TO A COMPUTER

(75) Inventor: Hsi-Hsun Huang, Tao-Yuan Hsien (TW)

(73) Assignee: Transpacific Optics LLC, Wilmington, DE (US)

( * ) Notice: Subject to any disclaimer, the term of this patent is extended or adjusted under 35 U.S.C. 154(b) by 2028 days.

(21) Appl. No.: 09/828,856

(22) Filed: Apr. 10, 2001

(65) Prior Publication Data
US 2002/0147798 A1    Oct. 10, 2002

(51) Int. Cl.
G06F 15/177    (2006.01)
G06F 15/16    (2006.01)

(52) U.S. Cl.
USPC ........... 709/220; 709/203; 709/217; 358/474; 710/10; 713/1; 73/614

(58) Field of Classification Search
USPC ................. 358/527, 474, 1.15, 400; 709/203, 709/217, 220; 713/1; 73/614; 710/10; 707/513
See application file for complete search history.

(56) References Cited

U.S. PATENT DOCUMENTS

| | | | | |
|---|---|---|---|---|
| 5,587,533 A * | 12/1996 | Schneider et al. | ............... | 73/614 |
| 6,134,017 A * | 10/2000 | Schlank et al. | ............... | 358/1.15 |
| 6,289,371 B1 * | 9/2001 | Kumpf et al. | ................. | 709/203 |
| 6,330,068 B1 * | 12/2001 | Matsuyama | ................. | 358/1.14 |
| 6,459,499 B1 * | 10/2002 | Tomat | ........................... | 358/1.15 |
| 6,594,690 B2 * | 7/2003 | Cantwell | ........................ | 709/217 |
| 6,785,805 B1 * | 8/2004 | House et al. | ....................... | 713/1 |
| 6,961,153 B1 | 11/2005 | Hidaka | | |
| 7,120,910 B2 * | 10/2006 | Matsuda et al. | ............. | 718/102 |
| 2002/0004802 A1 * | 1/2002 | Shima | ........................... | 707/513 |
| 2002/0085244 A1 * | 7/2002 | Blasio et al. | .................. | 358/474 |

* cited by examiner

*Primary Examiner* — David K Moore
*Assistant Examiner* — Quang N Vo
(74) *Attorney, Agent, or Firm* — Perkins Coie LLP

(57) ABSTRACT

A server enables a user at a station to scan a document. The station has a computer connected to the network, a browser installed on the computer to enable the user to browse the network, and a scanner in communication with the computer. The server has a database of scanner drivers, a driver selection system that enables the user to select a driver for the scanner from the database of scanner drivers, and a delivery system that transfers a selected driver to the computer and causes the computer to execute the driver. The user uses the browser and the driver selection system to select a driver for the scanner. The delivery system then sends the driver to the computer, and the computer executes the driver. The driver uses the scanner to scan a document, and scanning data corresponding to the document is saved in a predetermined location.

34 Claims, 5 Drawing Sheets

NETWORK SERVER FOR PROVIDING SCANNING FUNCTIONALITY TO A COMPUTER

BACKGROUND OF THE INVENTION

1. Field of the Invention

The present invention concerns a network server. More specifically, a network server is disclosed that enables a user to use a scanner by downloading the driver for the scanner.

2. Description of the Prior Art

The explosion of the Internet has coincided with the rising popularity of portable computing. Many people now prefer to buy laptop computers in lieu of traditional desktop computers for, despite the added expense, being able to carry their computers wherever they go is a great convenience for these users. The introduction of the universal serial bus (USB) standard for linking peripheral devices to computers has further simplified the computing environment. Whereas before the advent of USB a plurality of different connection schemes were used to link, say, various scanner models to a computer, now a single USB port can be used to connect to any type of scanner. This has been of great benefit to the users of portable computers as they may now bring their computers to a remote location and, if a scanner is available and is USB compatible, they can easily connect their computer to the scanner.

Although the scanner and the physical connection may be available at a remote site, the necessary driver software for the scanner may not be. Generally, scanner driver software is resident on the host computer. If the host computer is moved, as is the case for laptop computers, to a new location with a different type of scanner, the driver software will not be able to properly communicate with the different scanner. Thus, though a resource is physically available, it is still unusable. This can be a source of considerable frustration for users.

SUMMARY OF THE INVENTION

It is therefore a primary objective of this invention to provide a server on a network that allows a user on a host computer to download and execute driver software to perform a scan. The scanned image may be saved on the host computer, the server, or another remote location.

The present invention, briefly summarized, discloses a server for a network. The server enables a user at a station to scan a document. The station has a computer connected to the network, a browser installed on the computer to enable the user to browse the network, and a scanner in communication with the computer. The server has a database of scanner drivers, a driver selection system that enables the user to select a driver for the scanner from the database of scanner drivers, and a delivery system that transfers a selected driver to the computer and causes the computer to execute the driver. The user uses the browser and the driver selection system to select a driver for the scanner. The delivery system then sends the driver to the computer, and the computer executes the driver. The driver uses the scanner to scan a document, and scanning data corresponding to the document is saved in a predetermined location.

It is an advantage of the present invention that the user does not need to have scanner driver software pre-installed on the computer to use the scanner. In this manner, the user can connect to any of a plurality of supported scanners and use the scanners without any concern about not having appropriate supporting software. Additionally, with a well-managed database, the user is assured of receiving the most up-to-date scanner drivers possible. Also, the server permits the user to save the scanning data either in an account on the server, at another address on the network, or on the computer.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
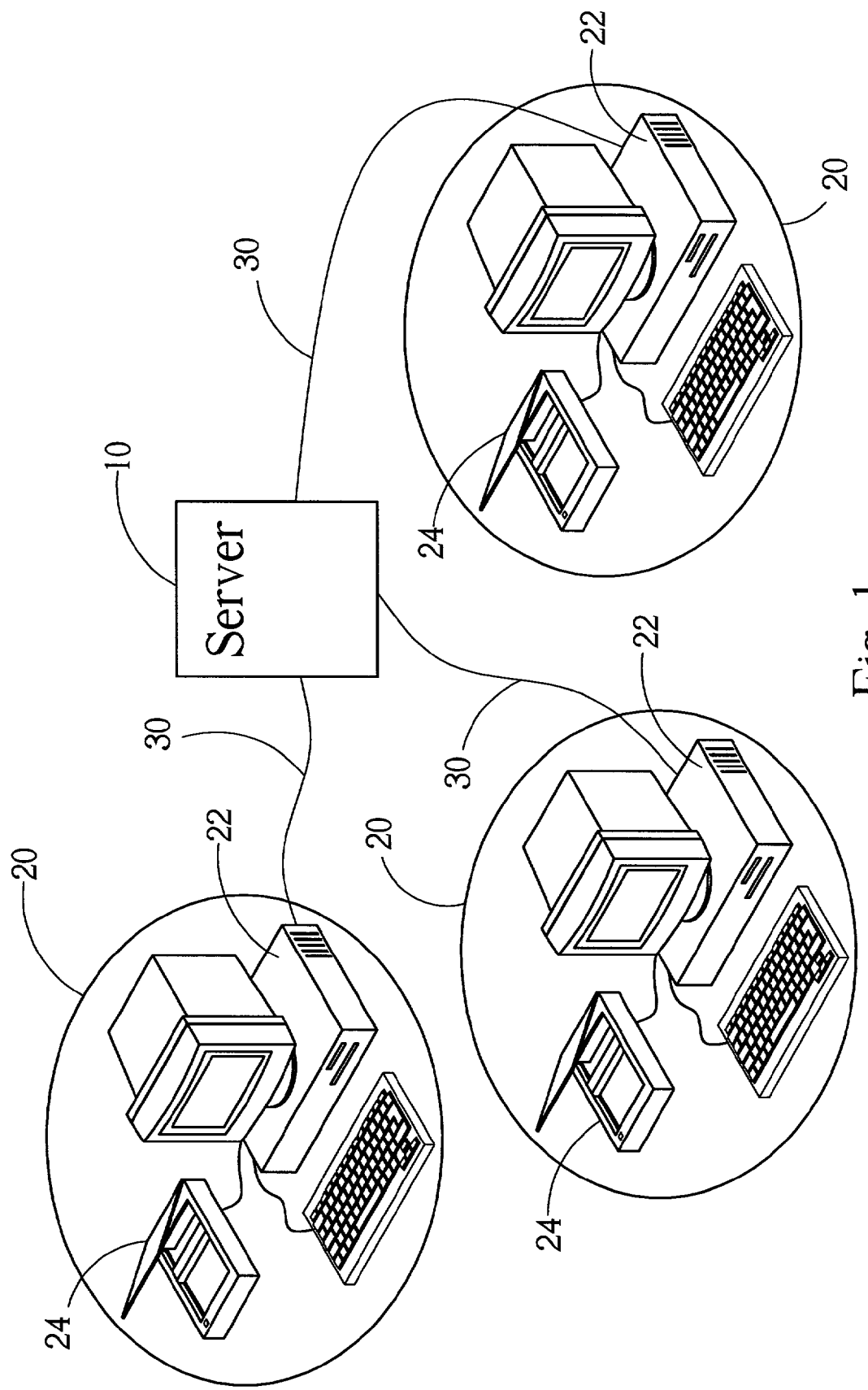
FIG. 1 is a block diagram of a server and stations according to the present invention.
Figure 2:
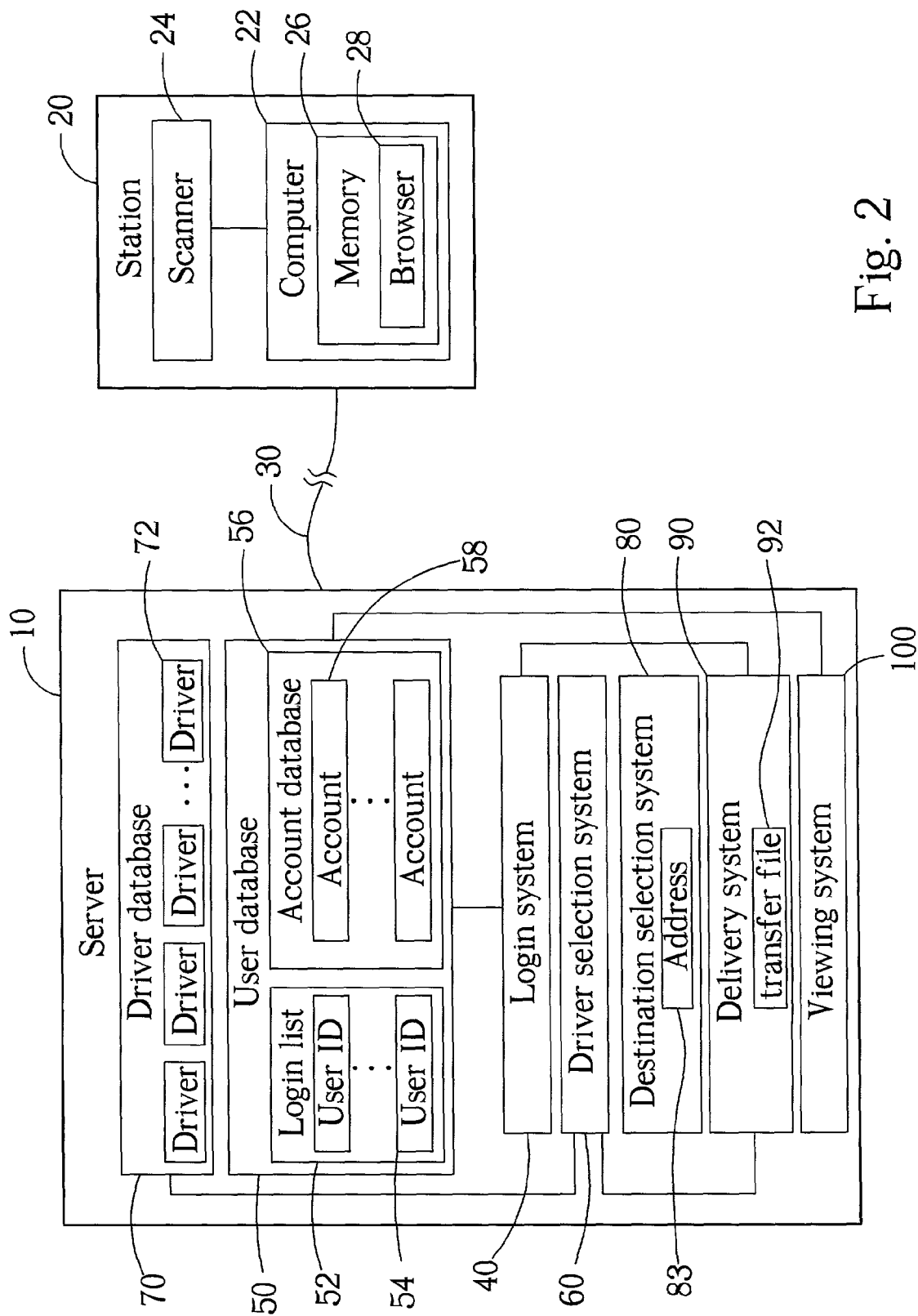
FIG. 2 is a function block diagram of the server and a station from FIG. 1.

Please refer to FIG. 1 and FIG. 2. FIG. 1 is a block diagram of a server 10 and stations 20 according to the present invention. FIG. 2 is a function block diagram of the server 10 and a station 20. The server 10 uses a network 30 to establish communications with a plurality of stations 20. The network 30 may be a local area network (LAN), a wide area network (WAN), or, in the preferred embodiment, the Internet. Hypertext transfer protocol (HTTP) and file transfer protocol (FTP) are used as communications standards between the server 10 and the stations 20.

Each station 20 comprises a computer 22 in communications with a scanner 24. The scanner 24 may be electrically connected to the computer 22 to establish the communications, but need not necessarily be so. For example, a wireless standard, such as Bluetooth, could be used to establish communications between the scanner 24 and the computer 22. The computer 22 is any sort of computing device, such as a portable computer, a desktop computer, a personal data assistant (PDA), etc. The computer 22 comprises a memory 26. This memory 26 may include working memory for the computer 22, such as dynamic random access memory (DRAM), or permanent storage memory, such as a hard disk. Held within the memory 26 is a browser program 28. When executed by the computer 22, the browser 28 enables a user to browse information across the network 30. Specifically, the browser 28 permits the user to access the server 10.

Figure 3:
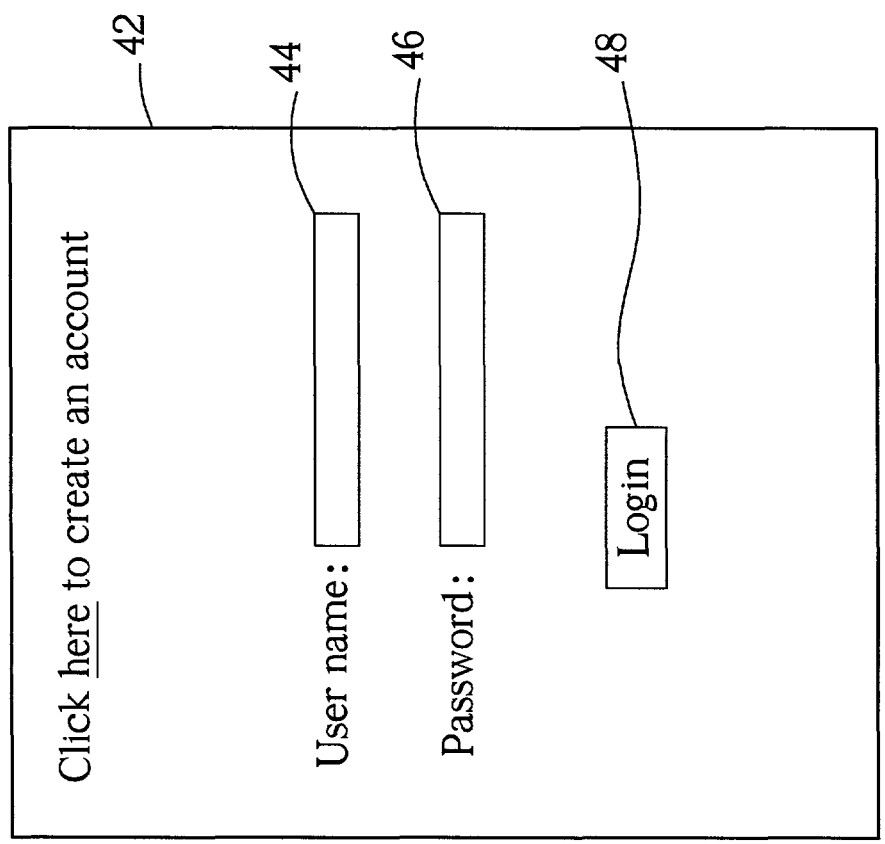
FIG. 3 is a view of a login page according to the present invention.

The server 10 comprises a login system 40. Please refer to FIG. 3 in conjunction with FIGS. 1 and 2. FIG. 3 is a view of a login page 42 according to the present invention. Upon receipt of an HTTP request from the browser 28, the login system 40 generates the login page 42 and sends the login page 42 to the browser 28. Using the browser 28, the user fills in a user name entry 44 and a password entry 46. Clicking on a login button 48 then causes the browser 28 to send the information in the entries 44 and 46 to the server 10. The login system 40 uses the user name information 44 and the password information 46 and compares them against user identification entries 54 in a login list 52. A matching user identification entry 54, having an appropriate user name and password combination matching the entries 44 and 46, is used by the login system 40 to associate the user name entry 44 with an account 58 in an account database 56. The login system 40 thus associates the computer 22 with an individual account 58 on the server 10. The account 58 is used to hold data for the user of the computer 10. The login system 40 may then send so-called "cookies" to the browser 28 to uniquely identify the computer 22 with an account 58, and confirm a successful login procedure of the computer 22. These cookies are stored in the memory 26 of the computer 22, and may optionally be held valid by the server 10 for a predetermined length of time. If a cookie has expired, the login system 40 may require the user to re-login to the server 10.

Figure 4:
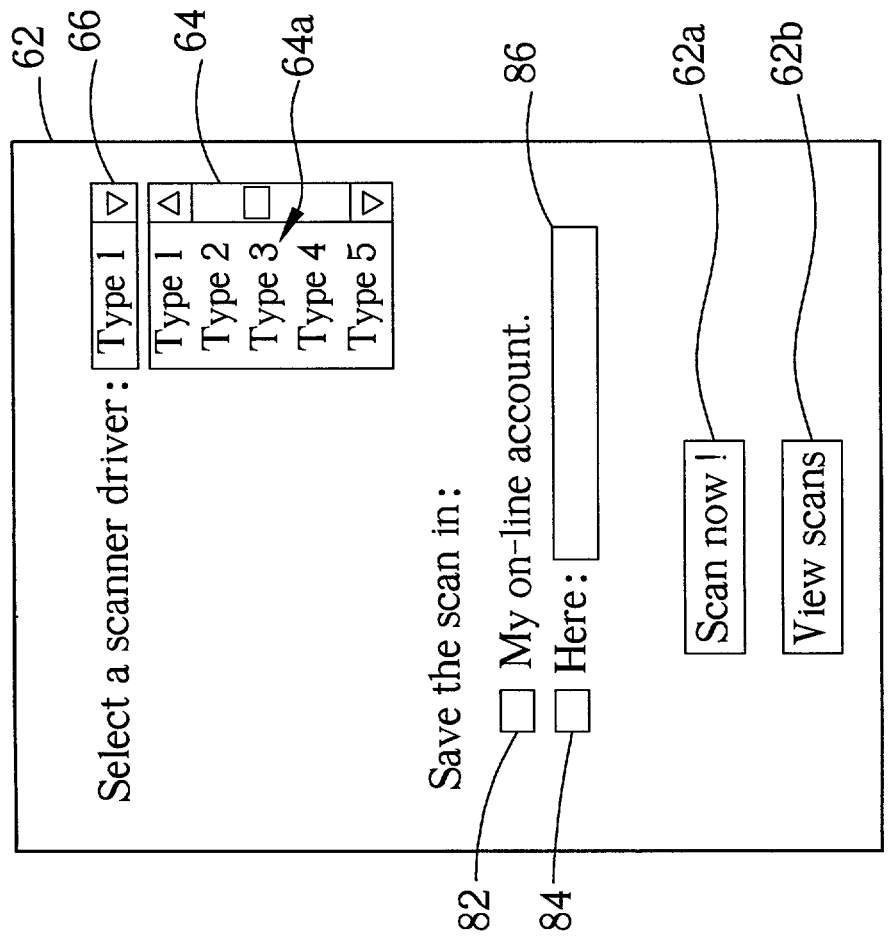
FIG. 4 is a view of a driver and destination page according to the present invention.

The server 10 also comprises a driver selection system 60. Please refer to FIG. 4 in conjunction with FIGS. 1 and 2. FIG. 4 is a view of a driver and destination page 62. After successfully logging into the server 10, the driver selection system 60 sends the driver and destination page 62 to the browser 28. The driver selection system 60 uses a driver database 70 to fill in entries 64a for a drop-down combination box 64 in the driver and destination page 62. The driver database 70 comprises a plurality of scanner drivers 72. Each scanner driver 72 supports a particular type of scanner, and is to be used by the computer 22 to perform a scan with the scanner 24. Ideally, the driver selection system 60 should fill the combination box 64 with descriptive entries 64a, such as the make and model of the scanner 24 which the driver 72 supports. Each driver 72 within the driver database 70 should therefore have an appropriately descriptive title that the driver selection system 60 can use as an entry 64a in the combination box 64. Furthermore, the drivers 72 should be as up-to-date as possible to ensure the best possible scanning performance from the scanner 24. Using the browser 28, the user can select one of the entries 64a that corresponds to the scanner 24. The selected entry 64a will then appear in a driver selection box 66.

The driver and destination page 62 also comprises destination information indicating where scanning data should be saved. By selecting a checkbox 82, the user indicates that he or she wishes the scanning data to be saved in the personal account 58 within the account database 56. By selecting a checkbox 84, the user indicates that the scanning data should be saved at an alternative site. A textbox 86 is used to indicate this alternative site, and is filled in by the user. The alternative site may be a local address on the computer 22, such as a hard disk in the memory 26, or a remote location on the network 30, such as an e-mail account or a universal resource locator (URL). For example, by filling in, "C:\My\Stuff\Scans" into the textbox 86, the user indicates that the scanning data should be saved locally on the computer 22. "someuser@somewhere.net" would indicate an e-mail address, whereas, "www.someplace.com/dir/filename" would indicate a URL.

When the user clicks a "scan now!" button 62a, the browser 28 sends the selected driver information in the driver selection box 66, the check state of the check boxes 82 and 84, and destination information in the textbox 86 to the server 10. A destination selection system 80 within the server 10 uses the check state of the check boxes 82 and 84, and any textual information from the textbox 86 to generate a destination address 83 for scanning data. The destination address 83 indicates where the scanning data should be saved after a scan with the scanner 24 has been completed. If the check box 82 is checked, then the address 83 simply indicates the account 58 of the user. If the check box 84 is checked, then the destination selection system 80 must properly parse the textual information from the textbox 86 to determine what the address 83 should be, and may need to append a default filename onto the address specified in the textbox 86 if the user merely indicated a destination directory. The destination selection system 80 may also verify write permission to any specified URL, and warn the user if the URL is not a valid destination.

After the destination selection system 80 has created the destination address 83, a delivery system 90 generates a transfer file 92. The transfer file 92 is a self-extracting executable file that contains a driver 72 from the database 70. The delivery system 90 selects a driver 72 from the database 70 according to the user-selected scanner driver type, which is obtained from the driver selection system 60 by way of data received from the browser 28 from the driver selection box 66. The self-extracting transfer file 92 may also contain the address 83 so that the driver 72 in the transfer file 92 will know where to send or save the scanning data. The delivery system 90 sends the transfer file 92 to the computer 22, and causes the computer 22 to execute the transfer file 92. When executed by the computer 22, the self-extracting transfer file 92 extracts the driver 72 and address 83, and executes the driver 72. The driver 72 interfaces with the scanner 24 and performs a scan of a document. Data from the scan is then saved at the location indicated by the address 83. In this manner, scanning data is saved either in the user account 58, is sent to an e-mail address, saved at a URL or saved in the memory 26 of the computer 22. After the driver 72 has finished the scanning of the document, and the saving of the scanning data, the driver 72 may cause itself to be erased from the memory 26, along with the self-extracting transfer file 92. This is done to prevent the memory 26 from becoming cluttered with unnecessary drivers 72 and old self-extracting transfer files 92. It should also be noted here that it is not absolutely necessary for the destination address 83 to be inserted into the self-extracting file transfer file 92 by the delivery system 90. When executed by the computer 22, it is also possible for the driver 72 to poll the server 10 to get the destination address 83.

Figure 5:
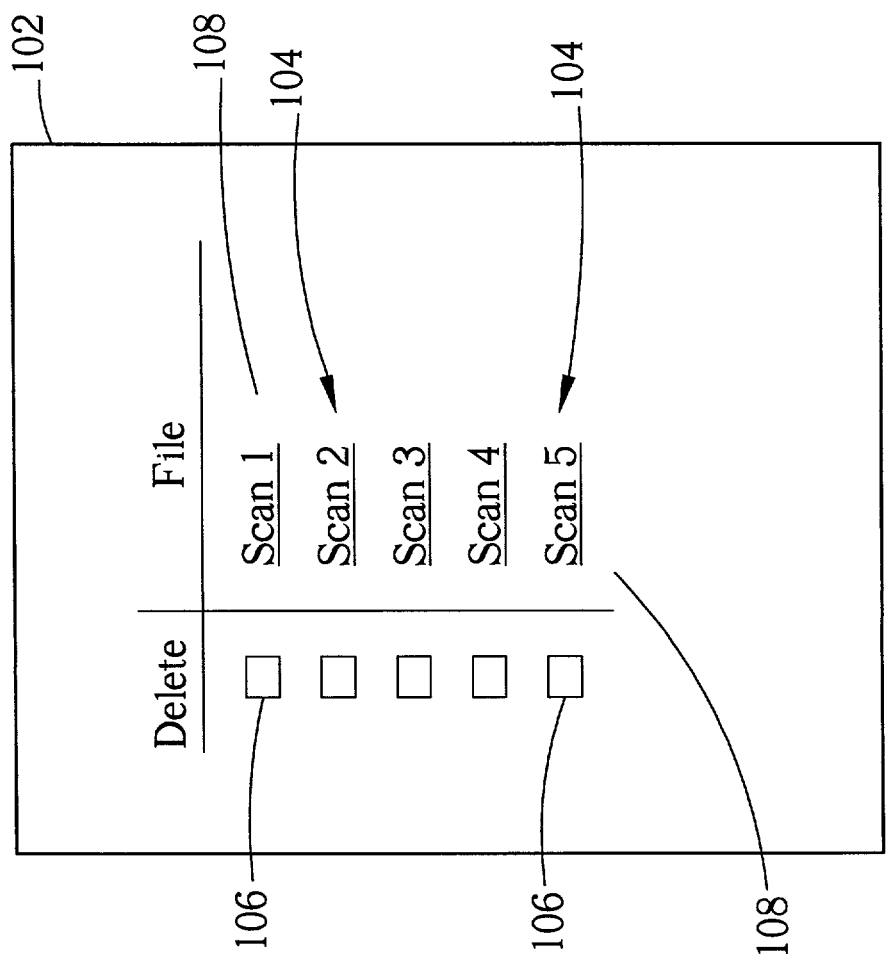
FIG. 5 is a view of a view scans page according to the present invention.

The driver and destination page 62 also has a "view scans" button 62b. When clicked, the "view scans" button 62b enables the user to view scanning data stored in the user account 58. Please refer to FIG. 5 in conjunction with FIGS. 1 and 2. FIG. 5 is a view of a view scans page 102. The server 10 also comprises a viewing system 100. When the "view scans" button 62b is clicked by the user, the viewing system 100 builds the view scans page 102 and sends the view scans page 102 to the browser 28. The viewing system 100 uses information in the user account 58 to build the view scans page 102. Specifically, the viewing system 100 uses scanning data stored in the user's account 58 to build the view scans page 102. The view scans page 102 comprises lines of data 104. Each line of data has a delete button 106, and a title 108. Each title 108 corresponds to scanning data of a document. When a title 108 is clicked, the viewing system 100 will send an image of the scanning data to the browser 28, i.e., as a JPEG or bit-mapped document. In this manner, the user is able to view previously scanned documents. It should be noted that, as the scanning data is stored on the server 10 in the account 58, and not in the memory 26 of the computer 22, the user can access and view the scanning data on any computer 22, so long as the computer 22 has access to the network 30. The delete buttons 106 allow the user to remove from his or her account 58 unwanted scanning data. By clicking on a delete button 106, the viewing system 100 removes scanning data corresponding to the title 108 on the same line 104 from the account 58.

Finally, it should be noted that, although the above discussion has been with reference to a moved computer using a new scanner, the present invention serves equally well for a moved scanner being connected to a new computer. That is, if a user carries his or her scanner 24 to a location having a different computer 22, it is fully possible that the computer 22 will not have a proper driver for the scanner 24. Nevertheless, the user can use the browser 28 to connect to the server 10 and obtain an appropriate driver 72.

Those skilled in the art will readily observe that numerous modifications and alterations of the server and station may be made while retaining the teachings of the invention. Accordingly, the above disclosure should be construed as limited only by the metes and bounds of the appended claims.

What is claimed is:

1. A server for a network, the server configured to enable a user at a computer to scan a document at a scanner to obtain scanning data, the server comprising:
   a database of scanner drivers;
   a driver selection system configured to enable the user to select a driver for the scanner from the database of scanner drivers in response to one or more inputs provided to a browser hosted at the computer, wherein the browser enables the user to browse information received over a data transmission network, and wherein the one or more inputs are received at the server over the data transmission network; and
   a destination selection system configured to enable the user to select a location from the browser for saving the scanning data, the location being selected from locations including locations other than the computer; and further configured to insert a destination address of the selected location for saving the scanning data in a self-extracting executable file, the self-extracting executable file also including the selected driver,
   wherein the server is configured to transfer the self-extracting executable file to the computer.

2. The server of claim 1 wherein the location comprises a universal resource locator (URL).

3. The server of claim 1 wherein the location specifies one or more media to be used to save the scanning data.

4. The server of claim 1 further comprising a login system configured to enable the user to access the driver selection system following establishing an identity of the user.

5. The server of claim 4 wherein the login system is configured to correlate the identity of the user with an account on the server, and wherein the scanning data is saved in association with the account.

6. The server of claim 5 wherein the account comprises an e-mail account.

7. The server of claim 5 further comprising a viewing system for enabling the user to view the scanning data saved in association with the account.

8. The server of claim 1 wherein the driver is configured to be removed from the computer after the scanning data is saved in the location.

9. The server of claim 1, further comprising:
   a delivery system to transfer the selected driver to the computer; and
   a network connection configured to transmit information between the data transmission network and at least one of the driver selection system or the delivery system.

10. The server of claim 1, wherein the location comprises an electronic mail (e-mail) account address.

11. The server of claim 1, wherein the destination selection system is further configured to:
   determine whether the user has write permission associated with the location; and
   warn the user if the location is not a valid destination for storing the scanning data.

12. The server of claim 1 wherein the selected driver is transferred to the computer over a file transfer protocol connection.

13. The server of claim 1 wherein the destination selection system enables the user to select a location from the browser by indicating the location in a text box provided by the browser.

14. A system comprising:
   a scanning station comprising a computer connected to a data transmission network, the computer including a browser that enables a user to browse information received over the data transmission network, and a scanner in communication with the computer; and
   a server comprising:
      a plurality of scanner drivers;
      a driver selection system to select one of the plurality of scanner drivers in response to one or more inputs provided to the browser and received over the data transmission network;
      a destination selection system to determine a location for storing scanning data from inputs to the browser, the location being selected from locations including locations other than the computer; and
      a delivery system to transfer the selected driver to the computer over the data transmission network,
      wherein the selected driver is configured to enable the computer to store images captured at the location,
      wherein the destination selection system is further configured to insert a destination address of the selected location for storing the scanning data in a self-extracting executable file, the self-extracting executable file also including the selected driver, and
      wherein the server is configured to transfer the self-extracting executable file to the computer.

15. The system of claim 14, wherein the server is configured to populate a menu viewable at the computer on the browser identifying two or more of the plurality of scanner drivers.

16. The system of claim 14, wherein the server is configured to render the menu according to a hypertext transfer protocol.

17. The system of claim 14, wherein the server further comprises a login system that enables the computer to access the driver selection system in response to authentication of the user.

18. The system of claim 17, wherein the server is configured to send one or more cookies for storage on the computer in response to the authentication.

19. The system of claim 14, wherein the location comprises a universal resource locator (URL).

20. The system of claim 14, wherein the location comprises an electronic mail (e-mail) account address.

21. A method comprising:
   receiving information over a data transmission network from a browser hosted on a computer, wherein the browser enables a user to browse information received over the data transmission network;
   enabling selection from the browser of at least one scanner driver from a plurality of scanner drivers in response to the received information;
   enabling selection from the browser of a location for storing scanning data in response to the received information, the location being selected from locations including locations other than the computer;
   inserting the selected scanner driver in a self-extracting executable file;

inserting a destination address of the selected location for saving the scanning data in the self-extracting executable file; and transferring the self-extracting executable file to the computer.

22. The method of claim 21, further comprising:

authenticating a user at the computer in response to information received at the browser; and enabling the selection of the at least one scanner driver in response to the authenticating the user.

23. The method of claim 21, wherein the receiving the information over the data transmission network comprises receiving the information according to a hypertext transfer protocol.

24. The method of claim 21, wherein the enabling selection of at least one scanner driver in response to the received information comprises receiving inputs from a menu rendered on the browser.

25. The method of claim 21 wherein the selected scanner driver is transmitted to the computer over a file transfer protocol connection.

26. The method of claim 21 wherein enabling selection of a location includes enabling selection of a location indicated in a text box provided by the browser.

27. A server configured to enable a user at a remote computer to scan a document at a scanner to obtain scanning data, the server comprising:

means for storing multiple scanner drivers;

means for enabling the user to select a driver for the scanner from the means for storing in response to one or more inputs provided to a browser hosted at the remote computer, wherein the browser enables the user to browse information received over a data transmission network, and wherein the server receives the one or more inputs over the data transmission network;

means for enabling the user to select a location from the browser for saving the scanning data, wherein the user selects the location from multiple locations including locations other than the remote computer; and means for transferring the selected driver to the remote computer in a self-extracting file, wherein the self-extracting file further includes the selected location.

28. The server of claim 27, further comprising means for authenticating the user.

29. The server of claim 27, further comprising means for storing scanning data of the user.

30. The server of claim 29, further comprising means for enabling the user to view the stored scanning data.

31. A computer-implemented method for scanning an original, the method comprising:

receiving at a first computer a request for authentication from a second computer coupled to a scanner, wherein the second computer does not have a driver for the scanner;

authenticating the second computer;

determining one or more scanner drivers that may be used for scanning, wherein at least one of the scanner drivers may be used by the second computer to communicate with the scanner;

providing an indication of the one or more scanner drivers to the second computer;

receiving a selection of a scanner driver from the second computer;

receiving a selection of a location for storing scanning data from the second computer, wherein the location is selected from locations including locations other than the second computer; and transferring the selected scanner driver to the second computer, wherein transferring the selected scanner driver to the second computer includes transferring the selected scanner driver in a self-extracting file to the second computer, and wherein the selected location is also included in the self-extracting file.

32. The computer-implemented method of claim 31 wherein receiving a selection of a location for storing scanning data from the second computer includes receiving a selection of a location to which the first computer is coupled, and wherein the method further comprises:

receiving a request to view stored scanning data from the second computer;

accessing the location to which the first computer is coupled;

retrieving the stored scanning data; and transferring the stored scanning data to the second computer.

33. The computer-implemented method of claim 31, further comprising:

determining whether the second computer has permissions necessary to store scanning data at the location; and sending a warning to the second computer if the second computer does not have permissions necessary to store scanning data at the location.

34. The computer-implemented method of claim 31 wherein the location is selected from at least one of a storage medium, an email address and a Uniform Resource Locator (URL).

* * * * *

UNITED STATES PATENT AND TRADEMARK OFFICE
CERTIFICATE OF CORRECTION

| | |
|---|---|
| PATENT NO. | : 8,463,878 B2 |
| APPLICATION NO. | : 09/828856 |
| DATED | : June 11, 2013 |
| INVENTOR(S) | : Huang |

Page 1 of 1

It is certified that error appears in the above-identified patent and that said Letters Patent is hereby corrected as shown below:

In the Specifications

Column 3, Line 45, delete ""C:\My\Stuff\Scans""" and insert -- "C:\MyStuff\Scans" --, therefor.

Signed and Sealed this
Sixth Day of May, 2014

Michelle K. Lee
*Deputy Director of the United States Patent and Trademark Office*